United States Patent [19]

Sher

[11] Patent Number: 6,041,379
[45] Date of Patent: *Mar. 21, 2000

[54] PROCESSOR INTERFACE FOR A DISTRIBUTED MEMORY ADDRESSING SYSTEM

[75] Inventor: Richard Alan Sher, Huntington, N.Y.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,117

[22] Filed: Oct. 4, 1996

[51] Int. Cl.$^7$ .................................................. G06F 13/00
[52] U.S. Cl. .......................... 710/129; 710/131; 710/132; 711/147
[58] Field of Search ........................... 395/200.3, 200.42, 395/200.43, 200.44, 200.45, 309, 311, 312, 840, 847, 800.29; 711/100, 147, 150; 709/200, 212–215; 710/129, 131, 132, 20, 27

[56] References Cited

U.S. PATENT DOCUMENTS

| | | | |
|---|---|---|---|
| 4,258,417 | 3/1981 | Berglund et al. ....................... | 364/200 |
| 4,344,132 | 8/1982 | Dixon et al. ............................. | 364/200 |
| 4,660,143 | 4/1987 | King et al. .............................. | 364/200 |
| 4,851,990 | 7/1989 | Johnson et al. ......................... | 364/200 |
| 4,912,698 | 3/1990 | Bitzinger et al. ........................ | 370/13 |
| 4,933,846 | 6/1990 | Humphrey et al. ..................... | 395/287 |
| 4,972,314 | 11/1990 | Getzinger et al. ....................... | 711/149 |
| 5,043,874 | 8/1991 | Jeddeloh et al. ........................ | 395/725 |
| 5,148,527 | 9/1992 | Basso et al. ............................. | 395/309 |
| 5,170,393 | 12/1992 | Peterson et al. ........................ | 370/255 |
| 5,212,777 | 5/1993 | Gove et al. .............................. | 395/570 |
| 5,265,243 | 11/1993 | Povenmere et al. .................... | 395/550 |
| 5,379,395 | 1/1995 | Nakabayashi et al. .................. | 395/425 |
| 5,396,598 | 3/1995 | Andersen et al. ....................... | 395/275 |
| 5,410,649 | 4/1995 | Gove ....................................... | 395/505 |
| 5,410,654 | 4/1995 | Foster et al. ............................ | 395/275 |
| 5,471,592 | 11/1995 | Gove et al. .......................... | 395/200.43 |
| 5,630,063 | 5/1997 | McConnell .......................... | 395/200.3 |
| 5,768,609 | 6/1998 | Gove et al. .......................... | 395/800.11 |
| 5,790,530 | 8/1998 | Moh et al. ............................... | 370/363 |

FOREIGN PATENT DOCUMENTS

WO 89/09967 10/1989 WIPO .

*Primary Examiner*—Xuan M. Thai
*Attorney, Agent, or Firm*—Terry J. Anderson; Karl J. Hoch, Jr.

[57] ABSTRACT

A processor interface for interfacing a CPU with a global memory and with other CPUs uses a node control bus for transmitting task and addressing information, and a fixed-speed, time-multiplexed direct connection to each memory block for data transmission. This arrangement provides a totally non-blocking interface between a CPU and a global SRAM memory.

6 Claims, 4 Drawing Sheets

PROCESSOR INTERFACE FOR A DISTRIBUTED MEMORY ADDRESSING SYSTEM

FIELD OF THE INVENTION

This invention relates to processor interfaces, and more specifically to a high-speed interface device for interfacing central processing units to a global shared memory.

BACKGROUND OF THE INVENTION

In conventional signal processor designs using array multiprocessor architectures, operating speed has been impeded by the bandwidth of their internal bus structure. In conventional architectures, the communication between global memory and the processors cannot maintain maximum execution speed for several reasons. These reasons include the following: (1) transfer of data from the global memory to any of its processing elements must wait for the bus to be free to accept another transfer; (2) the memory address register must complete its read/write cycle in order to process another addressing request; and (3) only a single processor can initiate an address in a sequential mode of operation. These factors result in a significantly lower execution efficiency, which has been measured as low as 10 percent of rated throughput for some typical applications.

A system level solution to this problem has been developed in the form of a distributed memory addressing system (DMAS) that includes an n-port memory design with simultaneous addressing of each port through a special time division multiplexing (TDM) structure. This structure allows both horizontal and vertical addressing of locations in the entire n-port memory address space. The data from each port is transferred from the ports' memory interface (MIF) over dedicated serial lines to each processor interface (PIF) which transfers the data to the processor (CPU).

The design of a suitable PIF poses several challenges: (1) In order to minimize technology upgrade costs, it should be capable of interfacing with any commercial off-the-shelf digital signal processor CPU; (2) In order to minimize the CPU's addressing overhead, it should be able to rearrange data based on CPU-controlled addressing parameters; (3) it should be able to transfer data serially to global memory in a non-blocking fashion by using TDM.

SUMMARY OF THE INVENTION

The present invention represents a solution to the above-identified PIF design problems by providing a unique combination of interface devices, status devices, control devices, address generators, buffer devices, and serial/parallel converters that cooperate with a node control bus and a high speed serial data transfer network connecting the PIFs to the MIFs.

DESCRIPTION OF THE PREFERRED EMBODIMENT

Figure 1:
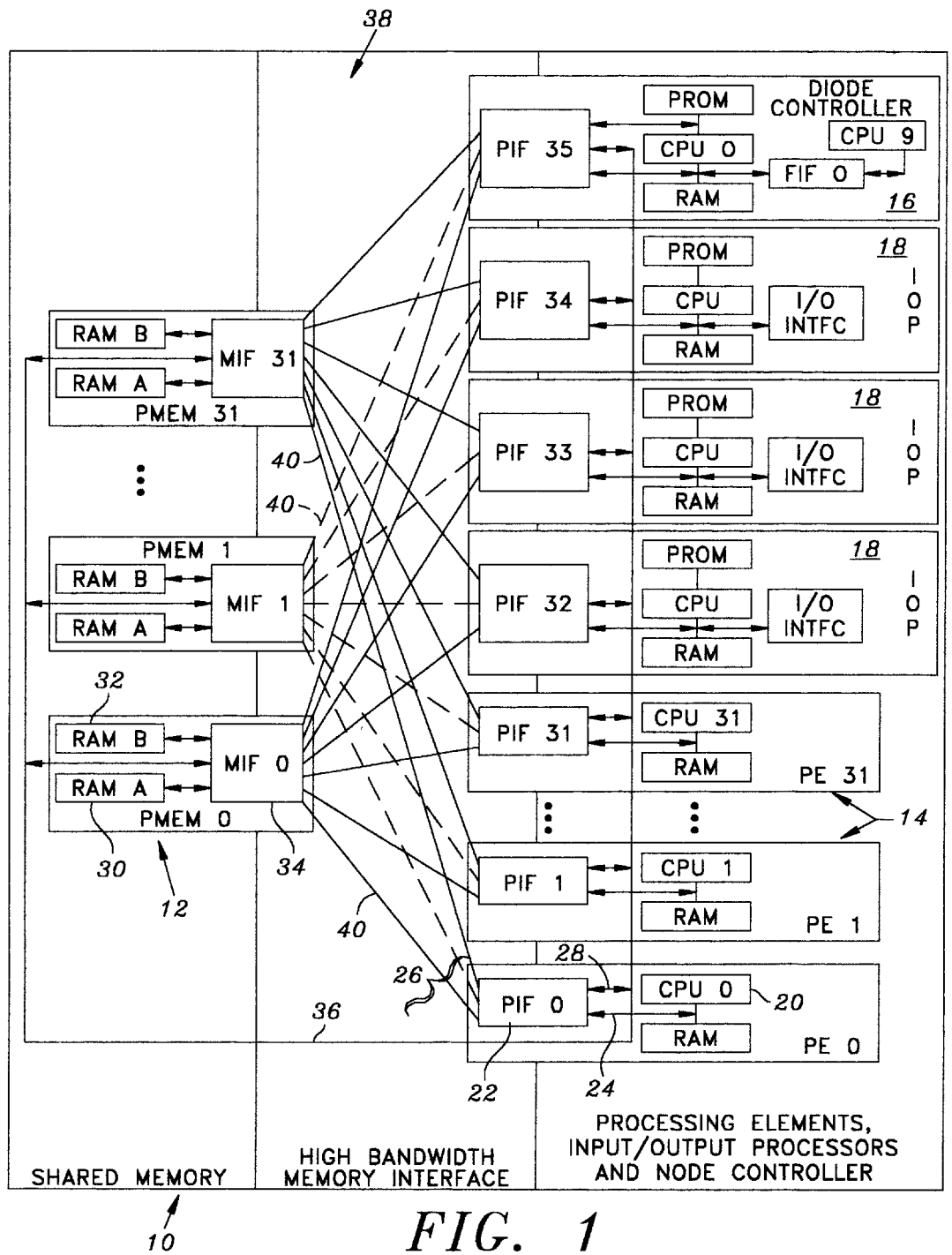
FIG. 1 is a block diagram of a 32×32 DMAS illustrating the environment in which the PIFs of this invention operate.

FIG. 1 shows the general architecture of a 32×32 DMAS 10, i.e. a DMAS which has thirty-two parallel memories (PMEMs) 12 and thirty-two processing elements (PEs) 14. The DMAS 10 also has a node controller (NC) 16 and one to three input/output processors 18, three being shown in FIG. 1.

Each PE 14 or IOP 18 consists of one CPU 20 and one PIF 22. The PIF 22 has one interface 24 to the CPU and a second interface 26, 28 to the rest of the DMAS system 10. Each PMEM consists of two memory elements or banks 30, 32 of memory (up to 8 Meg 32-bit words each) and one Memory Interface (MIF) 34 which interfaces the memory 30, 32 to the rest of the DMAS system 10.

All of the PIFs 22 and MIFs 34 are connected on a thirty-two bit wide 10 MHz node control bus (NCB) 36 where each MIF 34 and PIF 22 has a unique ID address associated with it. The bus 36 allows the NC 16 to send tasks to the PEs 14 and for the PEs 14 to send addressing parameters to the MIFs 34 and status information to the NC 16.

The PIFs and MIFs are also connected by a high speed (5.76 Gbytes/sec) serial data transfer network 38 over which all data is communicated between the CPU 20 and the memory banks 30, 32. In the 32×32 configuration shown in FIG. 1, each PEs' PIF 22 has two serial wires 40 connected in FIG. 1 to each MIF. In a 16×16 configuration, each PEs' PIF would have four serial wires to each MIF to allow the overall bandwidth of the system to be maintained. In a 8×8 configuration, each PEs' PIF would have eight serial wires to each MIF for the same reason. The PIFs of the NC 16 and the IOPs 18 have two wires to each MIF regardless of the configuration.

Figure 2:
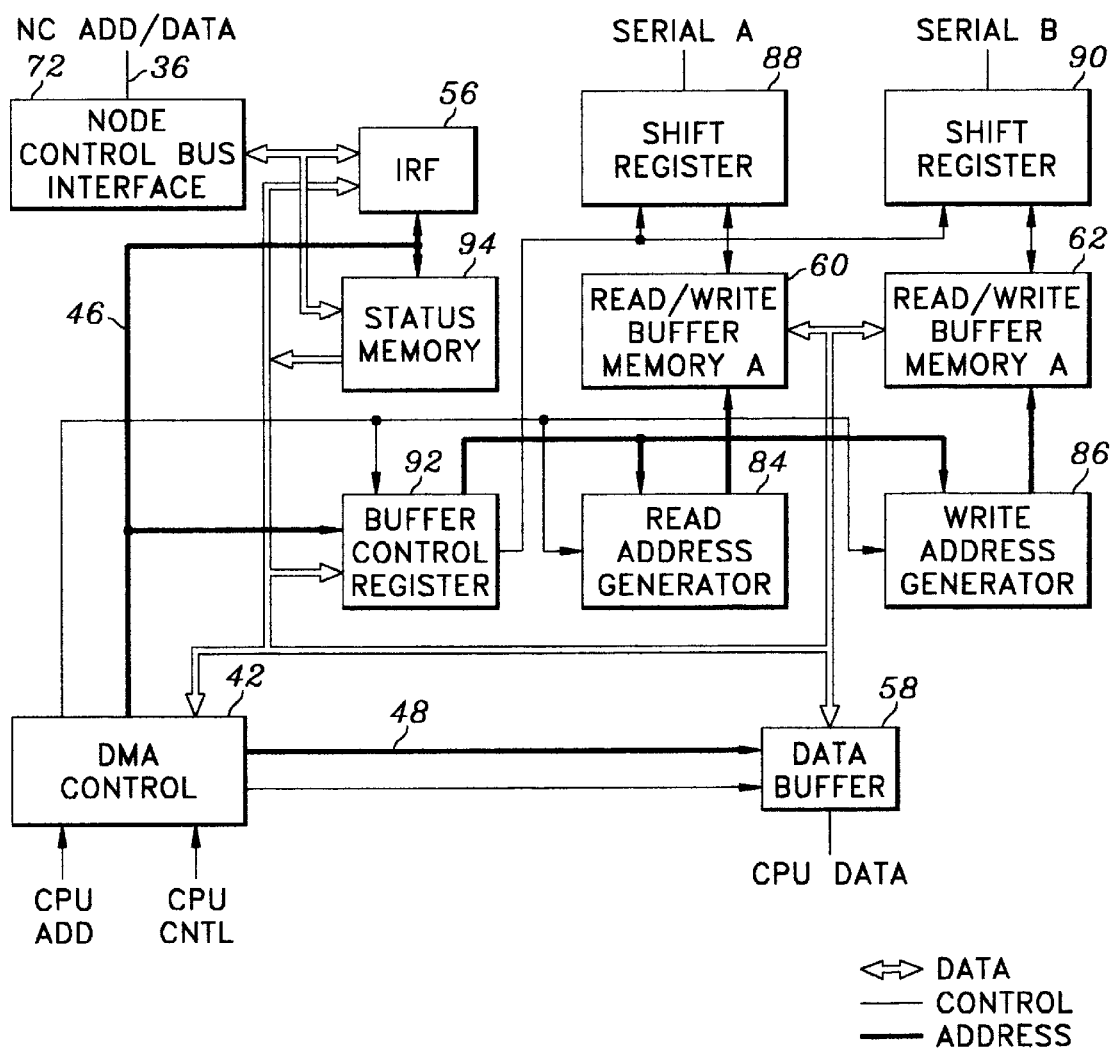
FIG. 2 is a block diagram of a PIF constructed in accordance with the invention.

The internal architecture of the inventive PIF is shown in FIG. 2. In that Figure, the doubled outlined lines and arrows interconnection lines designate data paths, the intermediate lines designate control paths, and the thick lines designate address paths.

Figure 3:
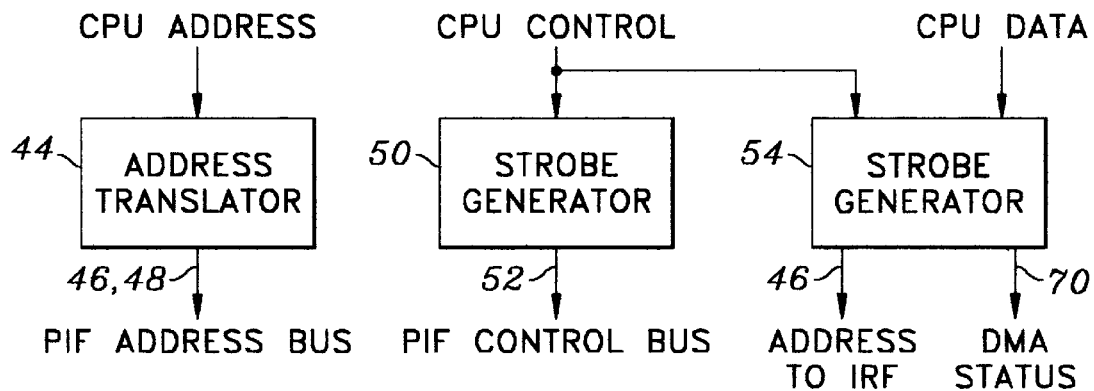
FIG. 3 is a block diagram of the DMA control.

Address and control signals from a CPU 20 are applied to the DMA control 42. As shown in FIG. 3, the DMA control 42 contains three components: 1) an address translator 44 which translates CPU addresses into the internal addresses of the PIF 22 and places them on the address buses 46, 48; 2) a strobe generator 50 which generates the read and write strobes for the PIF 22 which it places on bus 52, as well as the handshake signals to the CPU 20; and 3) a pair of counters 54 which control the data flow from the Interface Register File (IRF) 56 onto the NCB 36 (FIG. 1).

Data flow to and from the CPU 20 and in and out of the PIF 22 is controlled by the data buffer 58. Data out of the PIF 22 is multiplexed onto the data bus of the CPU 20 from one of eight possible sources: The low word read from either read buffer memory file (RBMF) of read/write buffer memory file (RWBMF) 60 or 62, the high word read from either RBMF or the RWBMF 60 or 62, low word IRF 56a, high word IRF 56b, status flag register (SFR) 96 (FIG. 5), SFR 98, status register (SR) 100, and the DMA Status register 70 which indicates if a DMA action is pending.

Data going into the PIF 22 is also multiplexed. This multiplexing is controlled by the least significant bit of the CPU 20 address to determine if the data is for low or high word addresses.

Figure 4:
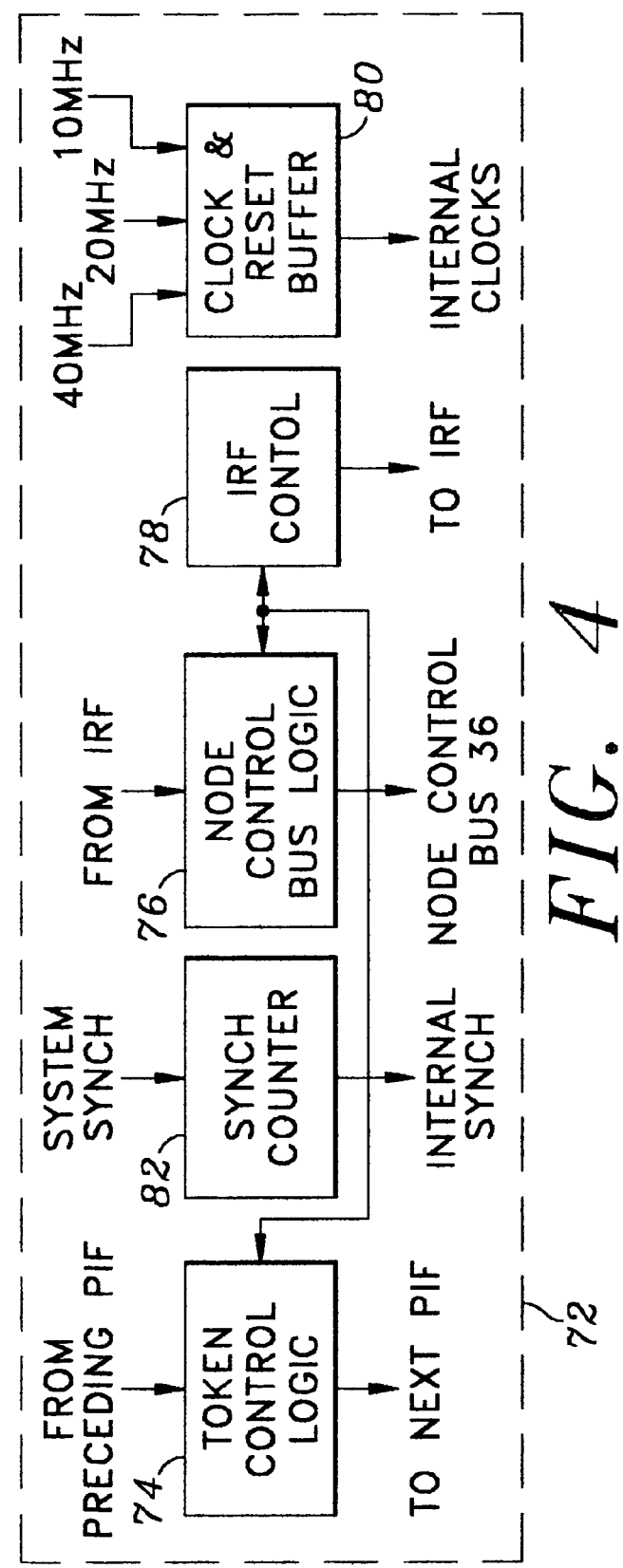
FIG. 4 is a block diagram of the NCBI.

The PIF 22 interfaces with the NCB 36 through the Node Controller Bus Interface (NCBI) 72. All of the PIFs 22 are interconnected in a token ring by the NCB 36. The NCBI 72 contains a token control logic 74 (FIG. 4) which receives the token from a preceding PIF 22 in the ring. If the PIF 22 does not need the NCB 36, the token is immediately sent to the next PIF 22 in the ring. If, on the other hand, the NCB is needed, the token is held in the token control logic 74. This causes the node control bus logic 76 and IRF control 78 to take the requisite data out of the IRF 56 and place that thirty-two bit wide data onto the NCB 36.

The clock and reset buffer 80 receives ten-, twenty-, and forty-MHz clocks from the system clock distribution. From these input clocks, the buffer 80 develops the necessary internal clocks to operate the PIF 22. The buffer 80 also generates the reset, scan and test mode buffering for the PIF 22. The scan signal is used to enable the scan mode for testing of the chip. The test signal is also used during scan mode to prevent the parallel load of certain elements and to maintain the scan clock to all of the elements.

Synchronization of the PIF 22 is achieved by the synch counter 82. Each PIF 22 in the system 10 receives a system synch signal from a system source (not shown). The synch counter 82 then counts down from the identification number of the particular PIF 22 to zero and generates an internal synch signal which is used to synchronize the PIF 22 with the MIFs 34. The time delay of the internal synch with respect to the system synch, which is different for each PIF 22, is used in the time division multiplexing scheme discussed below.

The IRF 56 consists of four thirty-two bit wide by sixty-four word deep dual port RAMS, two input and two output. The dual port RAMs are used to interface the CPU 20 to the NCB 36. These dual port RAMs allow the CPU 20 to read or write from the memories without any bus contention. The CPU 20 uses the IRF 56 to send Task Execution Blocks (TEBs) or Address Control Parameters (ACP) to other parts of the system 10 over the NCB 36.

When a data block is sent out on the NCB 36, each PIF 22 determines if the data is for this PE 14. If the PIF's ID matches the destination address, the data is placed in one of the two input RAMs of that PIF's IRF 56. The input of the IRF 56 is a ping/pong buffer which automatically switches from one input RAM to the other each time a set of data is received from the NCB 36. When either input RAM is loaded, an appropriate interrupt is set to tell the CPU 20 that new data has been received. The CPU 20 may then read this data through the data buffer 58 or wait until it completes its current task.

Data from the CPU 20 that is to be transmitted to the MIFs 34 is conveyed from the data buffer 58 to the RWMBFs 60, 62 which are under the control of read address generator (RAG) 84 and write address generator (WAG) 86.

The RAG 84 generates two sets of addresses: the Shift Register (SREG) to RBMF address and the RBMF to CPU address.

The SREG to RBMF address generation is a sequential address generation that is used directly as the write address for the dual port RAM in the RBMF. The RBMF to CPU address generation is responsible for generating the proper RBMF address to send the CPU the proper descrambled address for the data word that is requested.

Likewise, the WAG 86 generates two sets of addresses: the Write Buffer Memory File (WBMF) to SREG address and the CPU to WBMF address.

The WBMF to SREG address generation is a sequential address generation that is used directly as the write address for the dual port RAM in the WBMF. The CPU to WBMF address generation is responsible for generating the proper write buffer address to present to the WBMF the proper scrambled address for the data word from the CPU 20.

The PIF 22 has two RWMBFs 60 and 62. The RWBMF 60 serves shift register (SREG) 88, while the RWBMF 62 serves SREG 90. Each RWBMF contains two dual port RBMFs and two dual port WBMFS. Both the RBMFs and WBMFs have two memories each, one for the even SREG data and one for the odd SREG data. This gives the RAG the ability to perform the necessary addressing to retrieve the data in the proper (descrambled) order and the WAG to place the data in the proper (scrambled) order.

The SREGs 90, 92 function as serial/parallel converters. Each SREG contains thirty-two 32-bit parallel-to-serial registers and thirty-two 32-bit serial-to-parallel registers. The SREGs 90, 92 are responsible for shifting the parallel data from the WBMFs out to the global memory 12, and for converting the serial data from the global memory 12 to parallel data for the RBMFs.

The buffer control register (BCR) 92 is used as a buffer/register for the ACP values needed by the RAGs and WAGs of PIF 22. It also contains logic used to control the direction (read or write) of the SREGs 88, 90. The BCR contains the necessary buffering and control for two read queues and one write queue.

Figure 5:
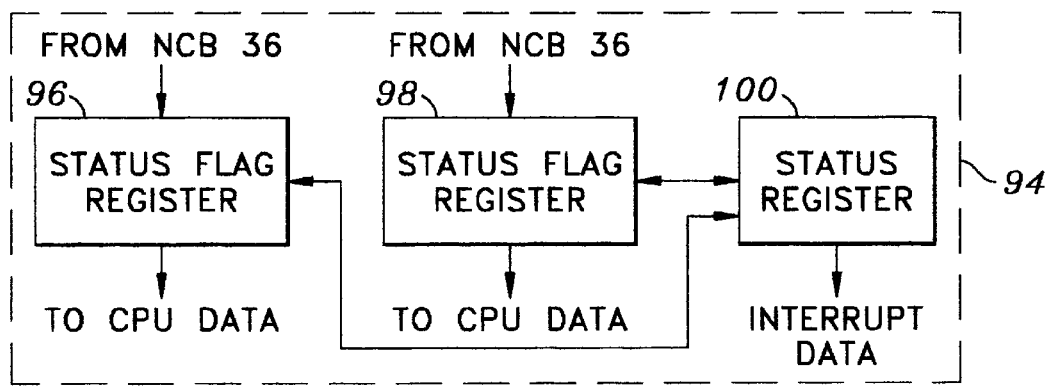
FIG. 5 is a block diagram of the status memory.

Interrupts for the CPU 20 and other PEs 14 are generated by the status memory 94. The status memory 94 contains two status flag registers (SFRs) 96, 98 and one status register (SR) 100 (FIG. 5). The SFRs 96, 98 contain one bit for each PE in the system. This allows any PE to send an interrupt to any other PE for PE-to-PE communication.

The SR is a thirty-two bit wide by thirty-six word deep dual port RAM with one address location assigned to each PE. When an interrupt is received via the SFRs, the PE can read the SR for that location and obtain one data word associated with the particular interrupt. The SFR and SR are also used by the PEs to inform the NC that a task has been completed.

It is understood that the exemplary processor interface for a distributed memory addressing system described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. An interface for interfacing a plurality of processors to each other and to a global memory in a non-blocking manner comprising:

a) said global memory including a plurality of memory elements;

b) said plurality of processors;

c) a node control bus;

d) said plurality of processor interfaces each connected to one of said plurality of processors and to said node control bus; and e) a plurality of serial fixed-speed interconnections between said plurality of processor interfaces and said plurality of memory elements, one interconnection extending between each of said plurality of processor interfaces and each said memory element, said plurality of fixed-speed interconnections permitting the maximum speed of operation regardless of the serial interconnection selected;

f) said each of said plurality of processor interfaces providing a non-blocking bi-directional memory access between one of said plurality of processors and said global memory.

2. The interface of claim 1, in which said plurality of processor interfaces pass data to or from said one of said plurality of processors associated therewith without conversion.

3. The interface of claim 1, which said plurality of processor interfaces each connected to one of said plurality of memory elements, and to said mode control bus, provide addressing parameter to said global memory over said node control bus but does not transmit any actual addresses.

4. The interface of claim 1, in which said processor interfaces provide an interface with others of said processors as well as with said global memory.

5. The interface of claim 1, in which said plurality of processor interfaces provide real-time bi-directional serial interconnections to multiple banks of each said memory elements simultaneously.

6. The interface of claim 1, in which data is transmitted between said plurality of processor interfaces and said global memory in a time-multiplexed fashion.

* * * * *